Figure 1:
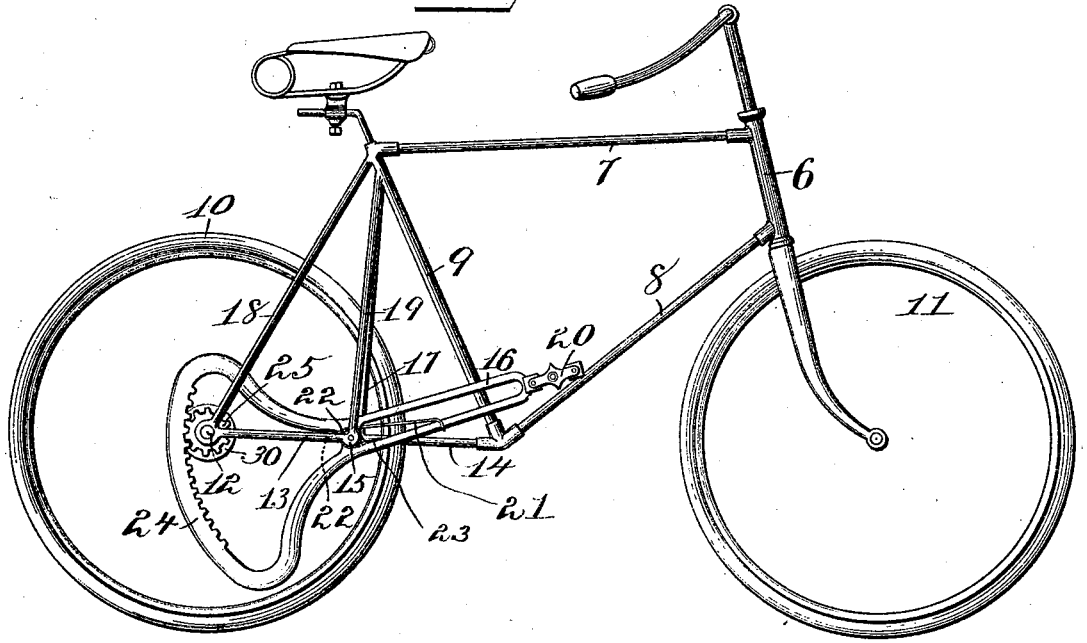
Figure 2:
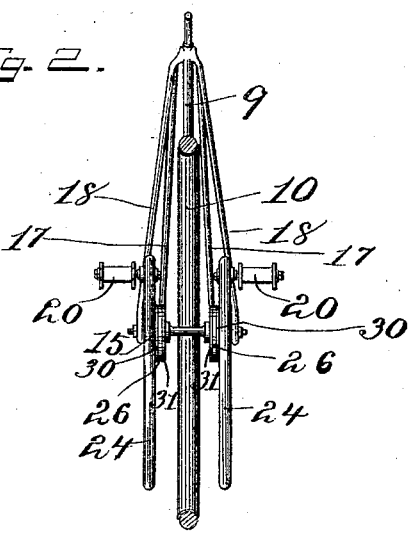
Figure 3:
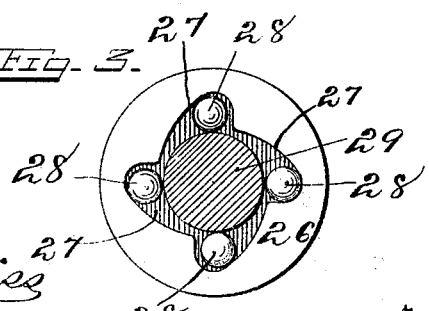

(No Model.)

M. J. CLARK & E. A. NORTHRUP.
BICYCLE.

No. 512,538. Patented Jan. 9, 1894.

Witnesses,

Inventors
Mason J. Clark.
Ernest A. Northrup.
By W. K. Stevens Atty.

UNITED STATES PATENT OFFICE.

MASON J. CLARK, OF CAROLINE CENTRE, AND ERNEST A. NORTHRUP, OF CORTLAND, NEW YORK.

BICYCLE.

SPECIFICATION forming part of Letters Patent No. 512,538, dated January 9, 1894.

Application filed June 14, 1893. Serial No. 477,515. (No model.)

*To all whom it may concern:*

Be it known that we, MASON J. CLARK, residing at Caroline Centre, Tompkins county, and ERNEST A. NORTHRUP, residing at Cortland, Cortland county, State of New York, citizens of the United States, have invented certain new and useful Improvements in Bicycles; and we do hereby declare the following to be a full, clear, and exact description of the invention, such as will enable others skilled in the art to which it appertains to make and use the same.

This invention relates to that class of carriages called bicycles, and its object is to provide means whereby the rider may propel the machine by using his feet alternately or by using only one foot, or by using both feet together.

To this end our invention consists in the construction and combination of parts forming the frame work, hereinafter described and claimed, reference being had to the accompanying drawings, in which—

Figure I, is a side elevation of a bicycle according to our invention. Fig. II, is a rear view of the same partly in transverse vertical section. Fig. III, is a detail view of a clutch mechanism showing the rear axle in cross section.

5 represents the frame of the machine, which may have any usual form of front post 6, longitudinal stringers 7, and 8, and seat post 9.

10 is the rear or drive wheel. As the forward wheel 11 and all its hangings and appurtenances are unaffected by this invention no description thereof is necessary. The rear wheel revolves upon an axle 12 which is fixed in the main frame, the construction of which frame is peculiar in the following respects. The stringer extending forward from the axle is parted into two portions 13 and 14, which are connected by a short axle 15 upon which the treadle lever 16 is journaled.

17 is a brace connecting the rear end of the stringer 14 with the top end of the post 9 forming thereby a rigidly fixed triangle.

18 is the top stringer extending from the rear axle to the top of the post 9, and 19 is a brace extending from the forward end of the stringer 13 to the top of the post 9 whereby another stiff triangle is formed comprising the three parts 13, 18 and 19, and these two triangles being connected together by the axle 15, another triangle is formed between this axle 15 and the braces 17 and 19. The wheel axle 12 and the two top stringers 18 also form a triangle. While this latter is not supposed to be new yet when connected with the sides, each comprising the three triangles described, an extremely stiff frame is produced, so that the various parts of the frame may be made very light and leave that stability and firmness which is a positive requisite for a good bicycle.

The pedal levers 16 may be provided with any usual or preferred pedal 20, upon which the foot acts only in the direction to move it downward, while a spring 21 has a constant tendency to lift and restore the treadle to its highest or normal position. This spring has the peculiarity of being coiled around the hub or axle at each side of the lever 16 with one end 22 extending rearward and attached to the stringer 13, and the other end 23 extending forward and attached to the stringer 14. This arrangement so balances the spring that no other attachment is necessary to keep it in place than to locate the end 22 under its supporting point. By this means of attachment a spring is left supple and free to act so that it will last a long time in service. The rear end of the treadle 16 is loop-shaped and provided with a segment of gear teeth 24, in the arc of a circle from the center of axle 15. Within this loop a pinion 25 is fitted to revolve freely upon the axle with its teeth engaging the segment.

26 is a clutch ring provided with a number of wedge-shaped pockets 27, and 28 represent balls in the pockets between the body of the ring and a hub 29 of the wheel.

30 and 31 are plates upon the faces of the ring and removably secured thereto, and engaging with the ends of the hub 29 to revolve freely thereon while they keep the clutch from sliding endwise relative thereto. The same description serves for the two pedals and all their connections. The wedge-shaped pockets in the clutches at both sides of the wheel being open or rather having the butt end of the wedge forward at the upper side of the hub, and at this butt end of the wedge each pocket is so large that the ball therein is perfectly free to revolve so that when the pedal rises and its segment of teeth 24 descends, thereby revolving the pinion 25 over backward the balls will all remain in the open end of the pocket and roll freely around the hub 29, but the instant the lever is depressed the pinion and clutch being rolled forward cause one or more of the balls to become wedged between the clutch ring and the hub thereby fastening the pinion to the wheel and causing the wheel to revolve with the pinion. By means of this gearing the rider is enabled to take either long or short strokes with one foot independently of the other, or if he suddenly meets with an obstacle requiring extra force to surmount it he may double his force by applying both feet to the pedals at once. The ratio between the arc of motion of the segment 24 and the circumference of the pinion 25 may be such as to give any desired rate of speed or of revolutions of the wheel relative to the strokes of the pedals. The pinion is within the loop of the treadle lever and always remains engaged with the segment 24, whereby strength, simplicity of construction and very light friction are secured.

Having thus described our invention, what we believe to be new, and desire to secure by Letters Patent, is the following:

1. The combination in a bicycle of the parts forming a frame having a seat post midway and adapted to be supported upon a forward and rear wheel; the portion at each side of the rear wheel comprising three triangles, two of which the forward and rear ones, lie in planes lengthwise of the frame, and the middle one comprising the rear brace of the said forward triangle the forward brace of the said rear triangle and a cross-bar or axle being transverse to the frame, substantially as specified.

2. The combination in a bicycle of frame portions forming a pair of triangles lying in the general plane of the frame at each side of the drive wheel; the forward brace of one triangle and the rear brace of the other triangle in each pair being joined by an axle forming transverse triangles; and a propelling lever journaled upon each of the said axles, substantially as specified.

In testimony whereof we affix our signatures in presence of two witnesses.

MASON J. CLARK.
ERNEST A. NORTHRUP.

Witnesses:
C. B. BROWN,
L. H. VAN KIRK.